United States Patent [19]

LeCun

[11] Patent Number: 5,625,708
[45] Date of Patent: Apr. 29, 1997

[54] METHOD AND APPARATUS FOR SYMBOL RECOGNITION USING MULTIDIMENSIONAL PREPROCESSING

[75] Inventor: Yann A. LeCun, Lincroft, N.J.

[73] Assignee: Lucent Technologies, Inc., Murray Hill, N.J.

[21] Appl. No.: 959,846

[22] Filed: Oct. 13, 1992

[51] Int. Cl.$^6$ ................................................. G06K 9/46
[52] U.S. Cl. .................... 382/202; 382/161; 382/286
[58] Field of Search .................. 382/14, 15, 13, 382/9, 16, 24, 48, 30

[56] References Cited

U.S. PATENT DOCUMENTS

| | | | |
|---|---|---|---|
| 3,133,266 | 5/1964 | Frishkopf | 382/13 |
| 4,284,975 | 8/1981 | Odaka | 340/146.3 J |
| 4,317,109 | 2/1982 | Odaka | 340/146.3 AC |
| 4,561,105 | 12/1985 | Crane et al. | 382/13 |
| 4,731,857 | 3/1988 | Tappert | 382/9 |
| 4,803,736 | 2/1989 | Grossberg et al. | 382/22 |
| 5,005,205 | 4/1991 | Ellozy et al. | 382/3 |
| 5,029,223 | 7/1991 | Fujisaki | 382/13 |
| 5,058,179 | 10/1991 | Denker et al. | 382/14 |
| 5,058,182 | 10/1991 | Kuan et al. | 382/13 |
| 5,067,164 | 11/1991 | Denker et al. | 382/15 |
| 5,093,803 | 3/1992 | Howard et al. | 364/807 |
| 5,105,468 | 4/1992 | Guyon et al. | 382/14 |
| 5,121,441 | 6/1992 | Chefalas et al. | 382/13 |
| 5,155,801 | 10/1992 | Lincoln | 382/14 |

*Primary Examiner*—Leo Boudreau
*Assistant Examiner*—Chris Kelley
*Attorney, Agent, or Firm*—Christopher N. Malvone

[57] ABSTRACT

Data samples describing a plurality of micro-segments that compose a symbol to be recognized are received from a device such as an electronic pad. A preprocessor maps the micro-segments into cells of an array that has several feature dimensions. The preprocessor assigns values to the cells based on the length of a micro-segment associated with the cell, and how well the features of the associated micro-segment correspond to the feature label of the cell. The cell values are used as inputs to a neural network that identifies the symbol. In one embodiment, recognizing symbols from large groups of symbols is facilitated by using a plurality of neural networks. Each neural network is trained to recognize symbols from a different subgroup of symbols, and each neural network can determine whether the symbol belongs to its subgroup.

27 Claims, 5 Drawing Sheets

METHOD AND APPARATUS FOR SYMBOL RECOGNITION USING MULTIDIMENSIONAL PREPROCESSING

CROSS-REFERENCE TO RELATED APPLICATION

Related subject matter is disclosed in co-pending application entitled "A Method and Apparatus for Symbol Recognition Using Multidimensional Preprocessing and Symbol Sorting", filed concurrently herewith and assigned to the same assignee hereof.

BACKGROUND OF THE INVENTION

1. Field of the Invention

The present invention relates to character recognition, more particularly, it relates to character recognition using preprocessing.

2. Description of the Prior Art

Some character recognition systems use a data array to represent a character, and then use the array as an input to a neural network. U. S. Pat. No. 5,067,164 describes a recognition system that uses a pixel array as an input to a neural network. Since a character comprises many pixels, a pixel array provides a large number of inputs to the neural network. A neural network capable of receiving such a large number of inputs is complex and difficult to train. This problem is compounded when an array with several dimensions is used to include additional information describing the character. As a result, it is necessary to map several pixels into a single cell of the array, where each cell encompasses a given volume. This reduces the number of inputs to the neural network and thereby reduces the network's complexity. Unfortunately, by mapping several pixels into a cell, a quantization error is introduced. This results in a character recognition system that has unacceptable error rates and a neural network that is difficult to train.

SUMMARY OF THE INVENTION

The present invention addresses the above described problem by providing a symbol recognition system in which small variations in symbols to be recognized produce small variations in the inputs to a neural network. The present invention uses a cellular array with multiple dimensions or multiple two-dimensional cellular arrays to quantify the features of a plurality of small line segments, or micro-segments, that compose a symbol. Each dimension represents a different feature such as x position, y position, trajectory angle, time, pen speed, pen acceleration, line start points, line endpoints, curvature, stroke index, pen-up/down and other features. In accordance with the principles of this invention, the value of each cell in the array is set to indicate how well a micro-segment associated with that cell matches the feature label of that cell, where a feature label indicates a cell's position in the array. As a result, small changes in the shape of a symbol produce relatively small changes in the value of a cell that is eventually used as an input to a neural network.

One embodiment of the present invention comprises means for collecting data that describes a symbol as having a first plurality of micro-segments. The collected data is used to associate the micro-segments with at least one cell in a second plurality of cells, where each cell has an associated feature label. Each cell is assigned a cell value using a micro-segment value that is related to how a feature of the micro-segment associated with the cell corresponds to the cell's feature label. A classifier receives the cell values assigned to the plurality of cells for recognizing or identifying the symbol.

Another embodiment of the present invention comprises means for assigning a cell value to a cell using a micro-segment value that is related to the length of the micro-segment associated with the cell.

An additional embodiment of the present invention comprises a plurality of neural networks where each neural network is selectively enabled based on whether a symbol belongs to a subgroup of symbols that the neural network is trained to recognize.

DETAILED DESCRIPTION

Figure 1:
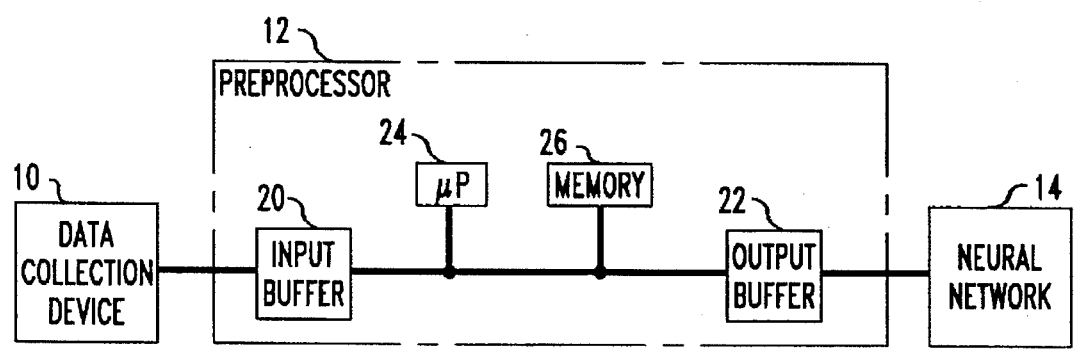
FIG. 1 is a block diagram of a symbol recognition system.

FIG. 1 is a block diagram of a symbol recognition system. Data collection device 10 provides data that describes the symbol to preprocessor 12. Preprocessor 12 maps the symbol to be identified into an array, assigns values to the cells that compose the array and provides the values of the cells to neural network 14. Neural network 14, which has been trained to identify or recognize the symbols in the symbol set of interest, identifies the symbol in question using the information provided by preprocessor 12.

Data collection device 10 may be implemented using a pad with an electronic pen, a terminal with a touch sensitive screen, an optical character reader, a device that scans symbols using an electromagnetic wave, a camera, or any other type of device, data source or communication link that provides data describing the symbol to be identified. In the case of an optical character reader, it may be necessary to skeletonize the symbol at some point in the preprocessing. Data collection device 10 may be a GRiDPAD from GRiD Systems Corporation, a Toshiba Pen PC from Toshiba America Information Systems, Inc., or another apparatus that collects data describing a symbol to be identified.

Preprocessor 12 comprises input buffer 20, output buffer 22, microprocessor 24 and memory 26. Input buffer 20 receives the data describing the symbol from data collection device 10 and stores that data for use by microprocessor 24. Input buffer 20 can be constructed using a Random Access Memory (RAM), a First-In-First-Out (FIFO) memory, registers, magnetic disks, optical disks, or any other memory device. Microprocessor 24 executes instructions stored in memory 26. Microprocessor 24 maps the symbol to be identified into an array which quantifies the features of the micro-segments composing the symbol, and assigns values to the cells of the array. Microprocessor 24 can be any computing device such as a microcomputer, PC, mainframe or specialized hardware. The values of the cells are placed in output buffer 22. Output buffer 22 provides the cell values to the inputs of neural network 14. Output buffer 22 can be constructed using memory devices similar to those used to implement input buffer 20.

Neural network 14 can be fabricated using analog or digital circuitry. If neural network 14 is analog in nature, output buffer 22 may be constructed using a D/A converter and a plurality of sample and hold devices that sample at the appropriate time. The sample and hold devices may be integrated circuits or capacitors. It should be noted that it is also possible to implement neural network 14 and/or preprocessor 12 as a program within a computer. For example, the preprocessor and neural network can be implemented on a SUN workstation or an AT&T 6386 PC. Neural network 14 may be replaced with another type of classifier such as associative memories, linear classifiers, polynomial classifiers, nearest neighbor classifiers, or vector quantizers.

Preprocessor 12 receives data describing the symbol in question from data collection device 10. This data can be in a variety of forms; however, it typically is in the form x(t) which describes horizontal position, and y(t) which describes vertical position. Data received in the form x(t) and y(t) enables microprocessor 24 to determine the size of the symbol, the pen speed and/or acceleration, line trajectories and a variety of other features. Techniques for determining features using x(t) and y(t) are known in the art, and are disclosed in U.S. Pat. No. 5,105,468 entitled "TIME DELAY NEURAL NETWORK FOR PRINTED AND RECURSIVE HANDWRITTEN CHARACTER RECOGNITION".

As an initial step in preprocessing, microprocessor 24 normalizes the size of the received symbol by increasing or decreasing the overall size of the symbol to a standard size (typically a standard height) while maintaining the aspect ratio of the symbol. Techniques for normalizing a symbol are known in the art and are disclosed in the above-referenced U.S. Pat. No. 5, 105,468. Additionally, each line or curve composing the symbol is broken into micro-segments based, for example, on the sample period of data collection device 10, where each sample represents an endpoint of a micro-segment. It is possible to base the micro-segments on any convenient sampling period by simply resampling the data provided by data collection device 10.

The micro-segments that make up the symbol are mapped into cells that compose an array which quantifies the features of the micro-segments. Each cell is assigned a value that is used as an input to neural network 14.

Figure 2:
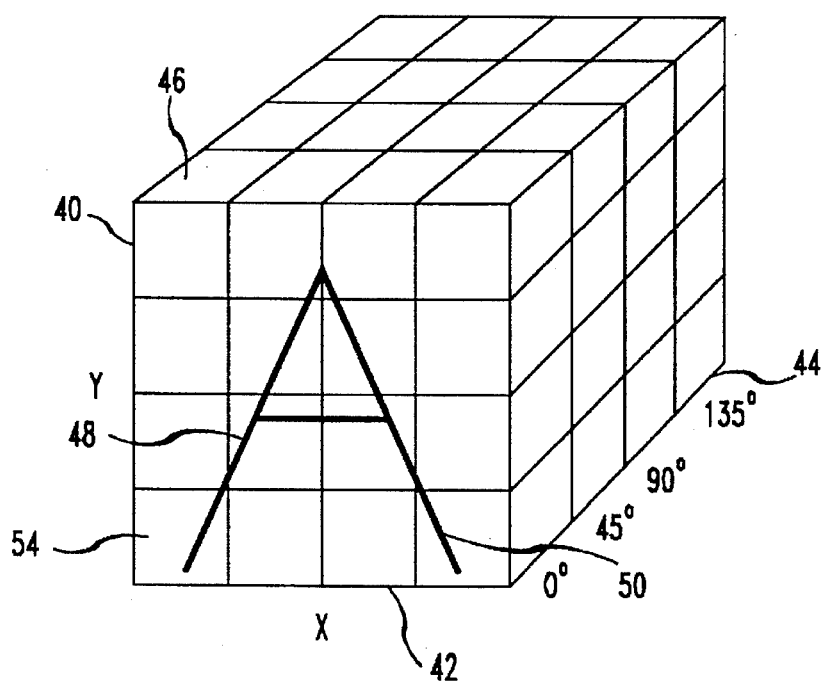
FIG. 2 illustrates a three-dimensional cellular array that quantifies the features of a micro-segment.

FIG. 2 illustrates a three-dimensional array that quantifies the features of the micro-segment. Note that the array is drawn as three dimensional for ease of visualization, and that the array can be implemented as a collection of locations in a memory. Axis 40 indicates the y position of a micro-segment, axis 42 indicates the x position of a micro-segment and axis 44 indicates the direction of the trajectory of a micro-segment. The three-dimensional array comprises sixty-four cells 46. In this example, axis 40 has been quantized into four cells that cover the y dimension of the symbol. Axis 42 has been quantized into four cells that cover the x dimension of the symbol. Axis 44 has been quantized into four cells that cover the possible trajectories for the micro-segments, that is, trajectories along a 0°/80° line, a 45°/225° line, a 90°/270° line and a 135°/315° line. Each micro-segment composing a symbol is mapped into or associated with the cell that has a feature label which most closely matches the features of the micro-segment. In the illustration, the entire symbol "A" is shown in the 0° cellular plane for clarity. It should be understood that leg 48 should be in the 45° cellular plane and leg 50 should be in the 135° cellular plane.

Other three-dimensional arrays may be used. Each axis can be assigned to any micro-segment feature and each dimension can be quantized into any number of cells. It is preferrable to use a three-dimensional array comprising a first axis with six cells that indicate a micro-segment's x position, a second axis with six cells that indicate a micro-segment's y position, and a third axis with four cells that indicate a micro-segment's trajectory direction.

It is also possible m map or associate a micro-segment with more than one cell. For example, if axis 44 was defined as the cosine of the angle between the micro-segment's trajectory and the trajectory lines listed along axis 44, the entire symbol "A" would be in each of the cellular planes along axis 44.

A three-dimensional array was used as an example; however, an array can be constructed using any number of dimensions. For example, a five-dimensional array can be used by assigning an axis to the micro-segment's x position, y position, trajectory, curvature and pen speed.

In some situations, there may be correlations between the features of a sequence of micro-segments. In the case of handwritten words, the time and x coordinate typically increase simultaneously. This results in an inefficient use of cells because only the cells which are near a diagonal in the array's x-t plane are populated. This problem is avoided by transforming the coordinate system so that the correlations between the features of the sequence of micro-segments are minimized. This is accomplished using known techniques such as a principal axis transform (also known as a Karhunen-Loeve transform) or Kohonen's topological map algorithm to distribute the micro-segments within the array. The Kohonen algorithm is described in Kohonen, T. "Self-Organized Formation of Topologically Correct Feature Maps," *Biological Cybernetics*, Vol. 43, pages 59–69, 1982.

Figure 3:
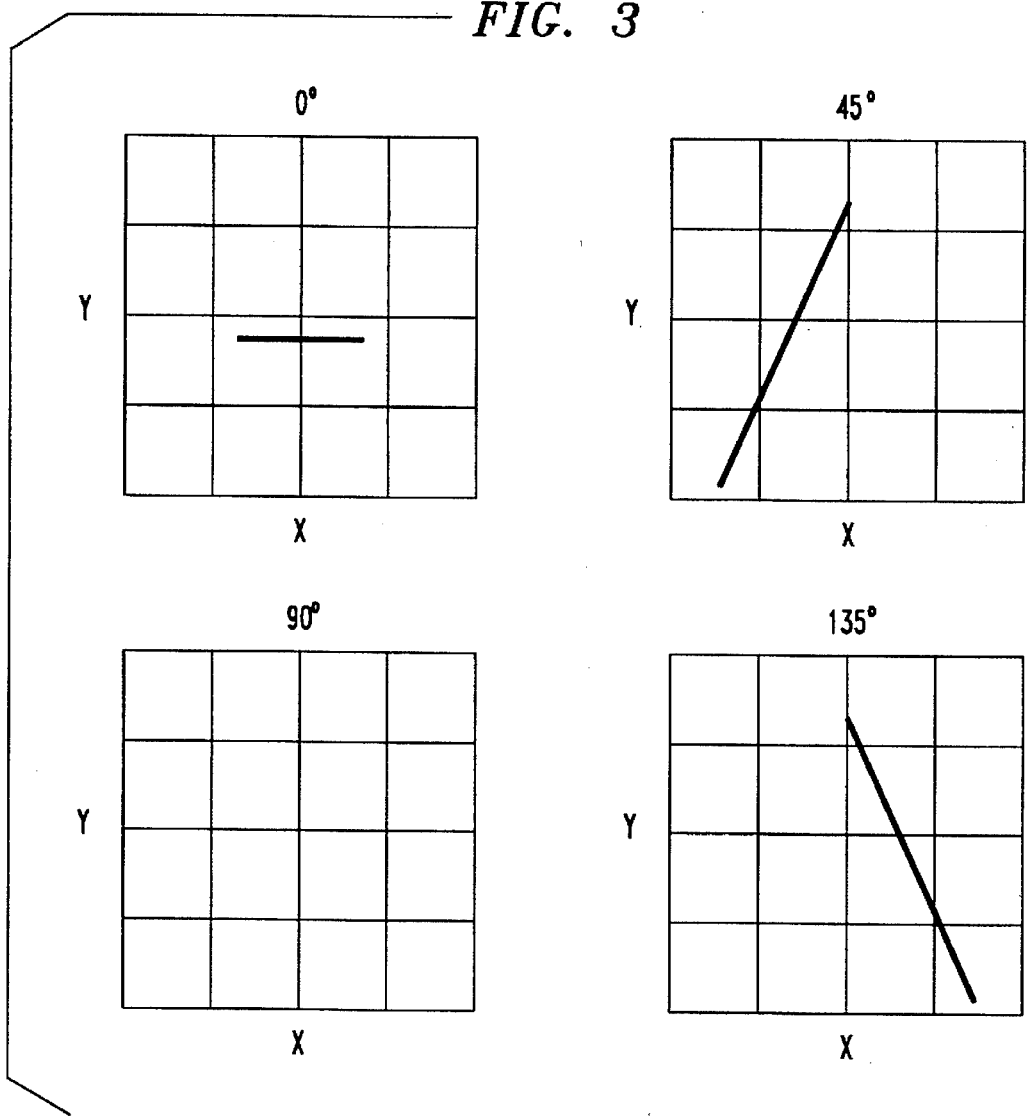
FIG. 3 illustrates the three-dimensional array of FIG. 2 represented as four 4×4 cellular array planes.

FIG. 3 illustrates the array of FIG. 2 in

FIG. 3 illustrates the array of FIG. 2 in a different format. This format consists of four two-dimensional cellular arrays where each of the four planar arrays correspond to a different trajectory from axis 44 of FIG. 2. Each planar array has a y and x axis that describes the position of the micro-segments. In this example, each planar array contains 16 cells so that a total of 64 cells are presented to the input of neural network 14.

Figure 4:
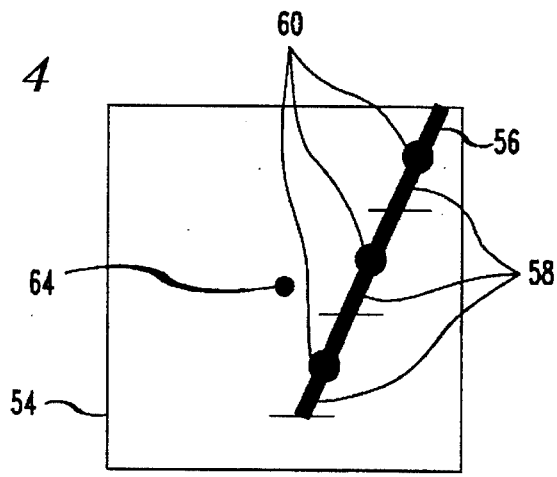
FIG. 4 illustrates one cell of the array in FIG. 2.

FIG. 4 is an enlarged view of cell 54 of FIG. 2. Line 56 is the portion of the symbol "A" that is contained in cell 54. Line 56 comprises micro-segments 58, with each micro-segment having a center point 60. The horizontal lines on line 56 indicate the boundaries between micro-segments. The feature label or center of cell 54 is represented by point 64. The value assigned to cell 54, which is provided to neural network 14, is based on how closely each micro-segment in cell 54 corresponds to the center of cell 54, and on the length and number of micro-segments in cell 54.

In determining the value of a cell, a value should be assigned to each micro-segment associated with the cell. The value of a micro-segment is determined by the micro-segment's distance from the center of the cell. This distance is measured from the center point of the cell to the center point of the micro-segment. The further that the center of the micro-segment is from the center of the cell, the lower the value that is assigned to that micro-segment. (It is also possible to assign higher values, but it is more convenient to use lower values). This decrease in value can be a linear function or any other convenient function. For example, in assigning a value to a micro-segment based on its two-dimensional distance from a center point of a cell, a two-dimensional Gaussian function can be used. It is also possible to use trigonometric functions. For example, cell 54's center for the trajectory dimension is represented by the 0°/80° line. The value of a micro-segment can be decreased based on the cosine of the angle between the 0°/80° line and the actual direction of the trajectory of the micro-segment. A multitude of other functions such as bell-shape functions, Mexican hat functions, difference of Gaussians or a spline may also be used.

A micro-segment's distance from the center of the cell can be treated separately for each dimension. For example, a Gaussian decrease in value can be used for the x direction, a linear decrease in value can be used for the y direction and a cosine reduction in value can be used for the trajectory dimension.

It is also possible to decrease the value of a micro-segment using a single multi-dimensional function such as a multi-dimensional Gaussian.

If separate functions are used to decrease a micro-segment's value, the reductions in value obtained for each dimension can be combined using a summation, product or other functions.

A value assigned to a micro-segment may be modified using a factor based on the length of the micro-segment. For example, longer micro-segments may be given more weight than shorter micro-segments.

The value of the cell that is provided to neural network 14 is obtained by summing the values assigned to the micro-segments mapped into the cell. For example, in a situation where a micro-segment's x - y value is determined with a two-dimensional Gaussian function of the micro-segment's x - y distance from the cell's x - y center, $(\Delta x, \Delta y)$ and where a micro-segment's trajectory angle value is determined with a cosine function of the angle between the micro-segment's trajectory and the cell's trajectory center $(\Delta \Theta)$, the cell value C can be expressed by the following equation where the summation is performed over the N micro-segments within the cell and where the factor $L_i$ is based on the length of micro-segment i $$C = \Sigma_{i=1}^{N} (\cos(\Delta \Theta) \text{ Gaussian } (\Delta x, \Delta y) L_i)_i.$$

Figure 5:
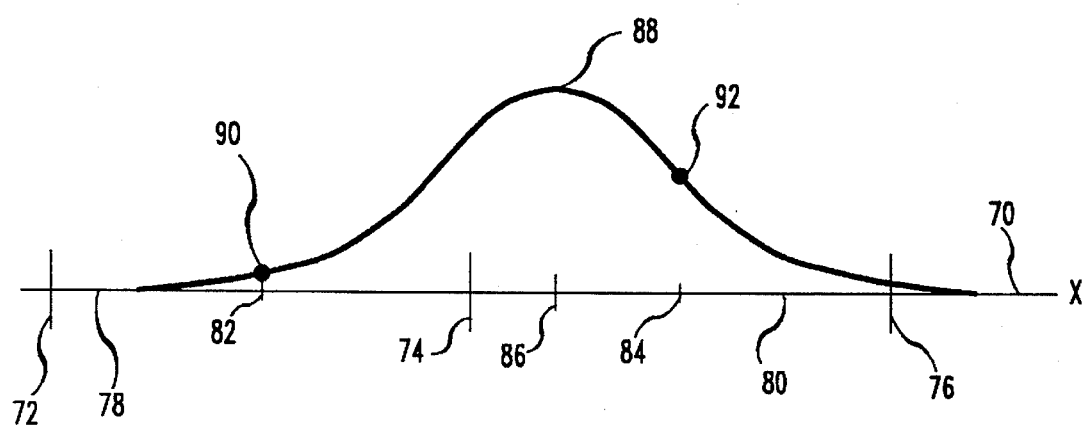
FIG. 5 illustrates a spreading function used in the x dimension.

The value of a cell may also be affected by micro-segments in other cells. FIG. 5 illustrates a spreading function which affects the value of cells based on a micro-segment that is contained in another cell. In this example, a micro-segment's position in the x dimension is used to determine the value of the cell in which the micro-segment is contained and the value of an adjacent cell. Axis 70 indicates the x dimension, and positions 72, 74 and 76 indicate the boundaries between adjacent cells in the x dimension. Cell 78 is bounded by the values of x at positions 72 and 74, and cell 80 is bounded by the values of x at positions 74 and 76. The x dimension center for cell 78 is indicated by position 82 and the x dimension center for cell 80 is indicated by position 84. Cell 80 contains a micro-segment that has its x dimension center at position 86. A spreading function indicated by curve 88 is used to assign values to the micro-segment in cell 80. In this example, the micro-segment in cell 80 is assigned two values. The first value is used in determining the value of cell 78 and the second value is used in determining the value of cell 80. The first value of the micro-segment is based on the distance between positions 86 and 82. Point 90 on curve 88 indicates the first value that the spreading function assigns to the micro-segment. The second value of the micro-segment is based on the distance between positions 86 and 84. Point 92 on curve 88 indicates the second value that the spreading function assigns to the micro-segment. The first value which corresponds to point 90 on curve 88 is used in determining the value of cell 78, and the second value which corresponds to point 92 on curve 88 is used in determining the value of cell 80.

Other spreading functions may be used such as a spreading function that affects more than two cells, or spreading functions that assign negative values to micro-segments.

Figure 6:
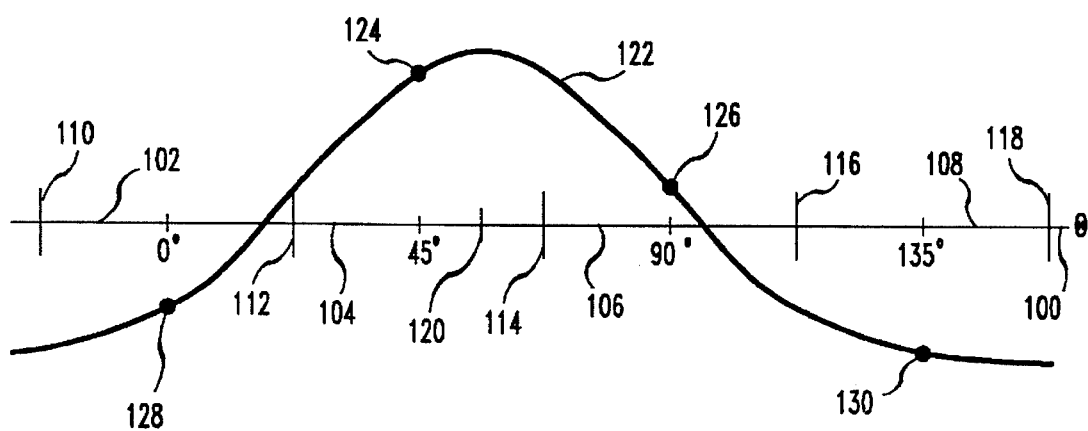
FIG. 6 illustrates a spreading function used in the $\Theta$ dimension.

FIG. 6 illustrates a spreading function that assigns both positive and negative values to a micro-segment. Axis 100 indicates the trajectory angle $\Theta$ of a micro-segment. The $\Theta$ dimension is broken into cells 102, 104, 106 and 108. Cell 102 has a $\Theta$ dimension center of 0 degrees and its boundaries are indicated by positions 110 and 112. Cell 104 has a $\Theta$ dimension center of 45 degrees and its boundaries are indicated by positions 112 and 114. Cell 106 has a $\Theta$ dimension center of 90 degrees and its boundaries are indicated by positions 114 and 116. Cell 108 has a $\Theta$ dimension center of 135 degrees and its boundaries are indicated by positions 116 and 118. A micro-segment in cell 104 has a trajectory along the 55 degree trajectory and is indicated by position 120. This micro-segment is used in determining the value of cells 102, 104, 106 and 108 even though the micro-segment is only located in cell 104. A spreading function indicated by curve 122 is used to assign values to the micro-segment based on the $\Theta$ dimension distances between the micro-segment and the center of cells 102, 104, 106 and 108. These assigned values are used in determining the values of the cells. Point 124 on curve 122 assigns the micro-segment a value that is used in determining the value of cell 104. Point 126 on curve 122 assigns the micro-segment a value that is used in determining the value of cell 106. Point 128 on curve 122 assigns the micro-segment a negative value that is used in determining the value of cell 102. Point 130 on curve 122 assigns the micro-segment a negative value that is used in determining the value of cell 108.

Any variety of spreading functions can be used to assign values to the micro-segments. The spreading functions can be limited to assigning a single value to a micro-segment that acts within one or more cells, or they may assign a plurality of values that act within one or more cells. These values may be negative or positive and can be defined using functions such as Gaussian functions, trigonometric functions, bell-shape functions, Mexican hat functions, difference of Gaussians or a spline.

The overall value assigned to each cell is used as an input to a classifier. Classifiers such as associative memories, neural networks, linear classifiers, polynomial classifiers, nearest neighbor classifiers, or vector quantizers can be used to identify a symbol based on the cell values.

Figure 7:
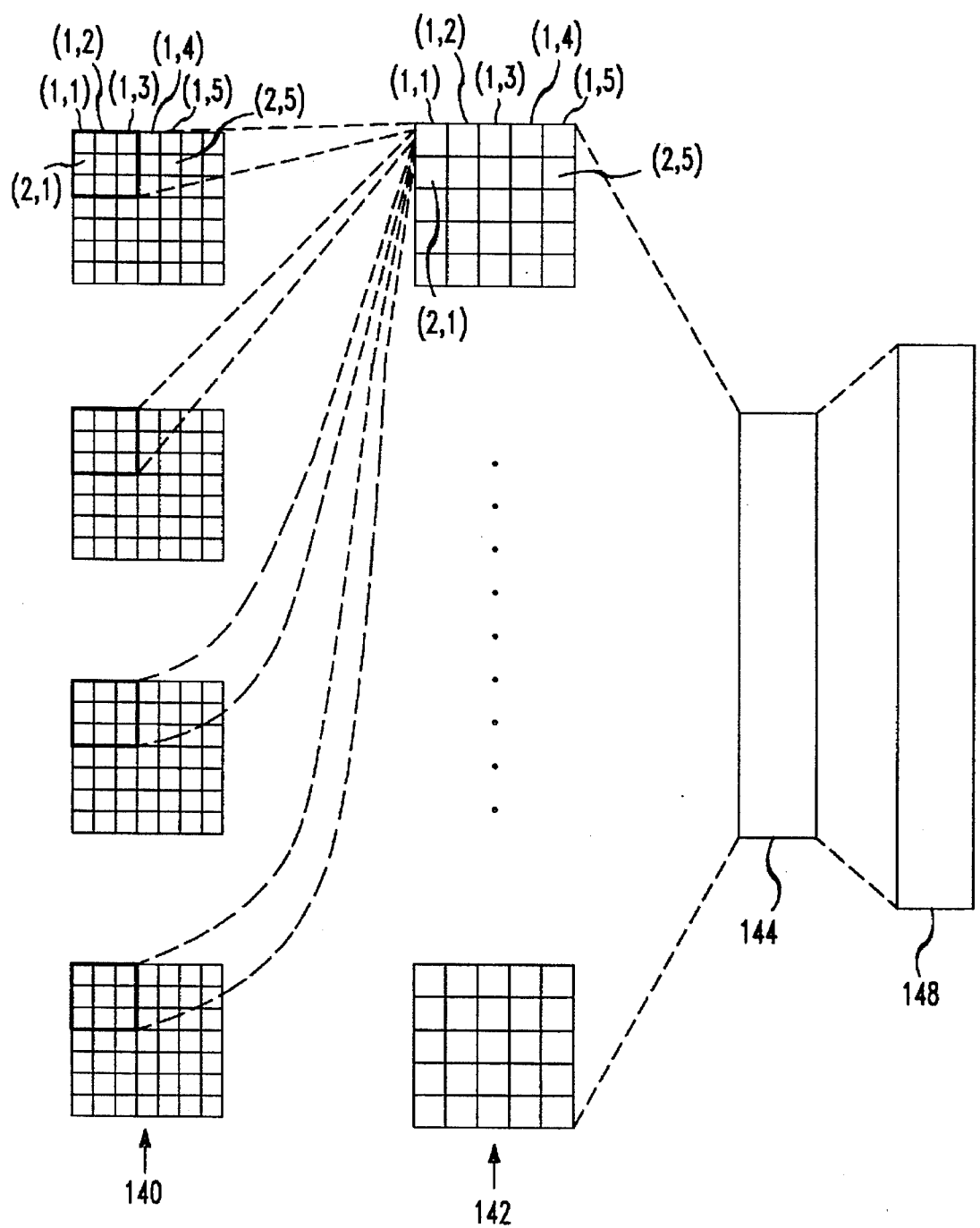
FIG. 7 represents a neural network.

FIG. 7 represents a neural network. The neural network comprises layers 142, 144 and 146. The cells of arrays 140 contain the cell values that are the inputs to the neural network. In this example, a three-dimensional cellular array was used to quantify the features of the micro-segments. Both the x and y dimensions were quantized into seven cells each, and the trajectory angle dimension was quantized into four cells. The three-dimensional array is represented as four 7×7 two-dimensional cellular arrays where each of the four planar arrays correspond to a different trajectory angle.

Layer 142 of the neural network receives its inputs from arrays 140. Layer 142 comprises eight groups of neurons where each group of neurons is arranged in a 5×5 matrix. This neural network is called a convolution neural network because all of the neurons in each group of layer 142 use the same set of coefficients or weights to modify the inputs received from the cells of arrays 140; however, each of the eight groups of layer 142 use different sets of coefficients.

Each neuron in layer 142 receives a total of thirty-seven inputs. The thirty-seven inputs comprise a bias input and nine inputs from each of arrays 140. The bias input is simply an input that has a value of one which is modified by a bias coefficient or weight. The neuron at position (1,1) in each of the groups of layer 142 receives inputs from four 3×3 blocks of cells or receptive fields that have an upper left hand corner at position (1,1) in their respective arrays. The neuron at position (1,2) in each of the groups of layer 142 receives inputs from four receptive fields that have an upper left hand corner at position (1,2) in their respective arrays. Neurons at positions (1,3) through (1,5) in each of the groups of layer 142 similarly receive inputs from four receptive fields that have an upper left hand corner at positions (1,3) through (1,5), respectively. Each row of neurons in layer 142 is connected similarly. For example, the neurons at positions (2,1) through (2,5) in each of the groups of layer 142 receive inputs from four receptive fields that have an upper left hand corner at position (2,1) to (2,5), respectively.

The output of each neuron of layer 142 is connected to each neuron of layer 144 that is, layers 142 and 144, are fully connected. Layer 144 has 30 neurons.

The output of the neurons of layer 144 are fully connected to the neurons of layer 148. The number of neurons in layer 148 is based on the number of symbols in the symbol set to which the input symbol belongs.

Neural networks of this type and similar networks are known in the art. Neural networks are discussed in U.S. Pat. No. 5,067,164 "Hierarchical Constrained Automatic Learning Neural Network for Character Recognition" and U.S. Pat. No. 5,058,179 "Hierarchical Constrained Automatic Learning Network for Character Recognition". Other neural network arrangements may also be used to perform symbol recognition.

Methods for training neural networks are well known. Publications such as "Parallel Distributed Processing" by Rumelhart, et al, (Bradford Books: Cambridge, Mass. 1986) discuss methods for training this type of neural network.

In applications that involve large or complex symbol sets, it may be advantageous to use several classifiers to identify symbols.

Figure 8:
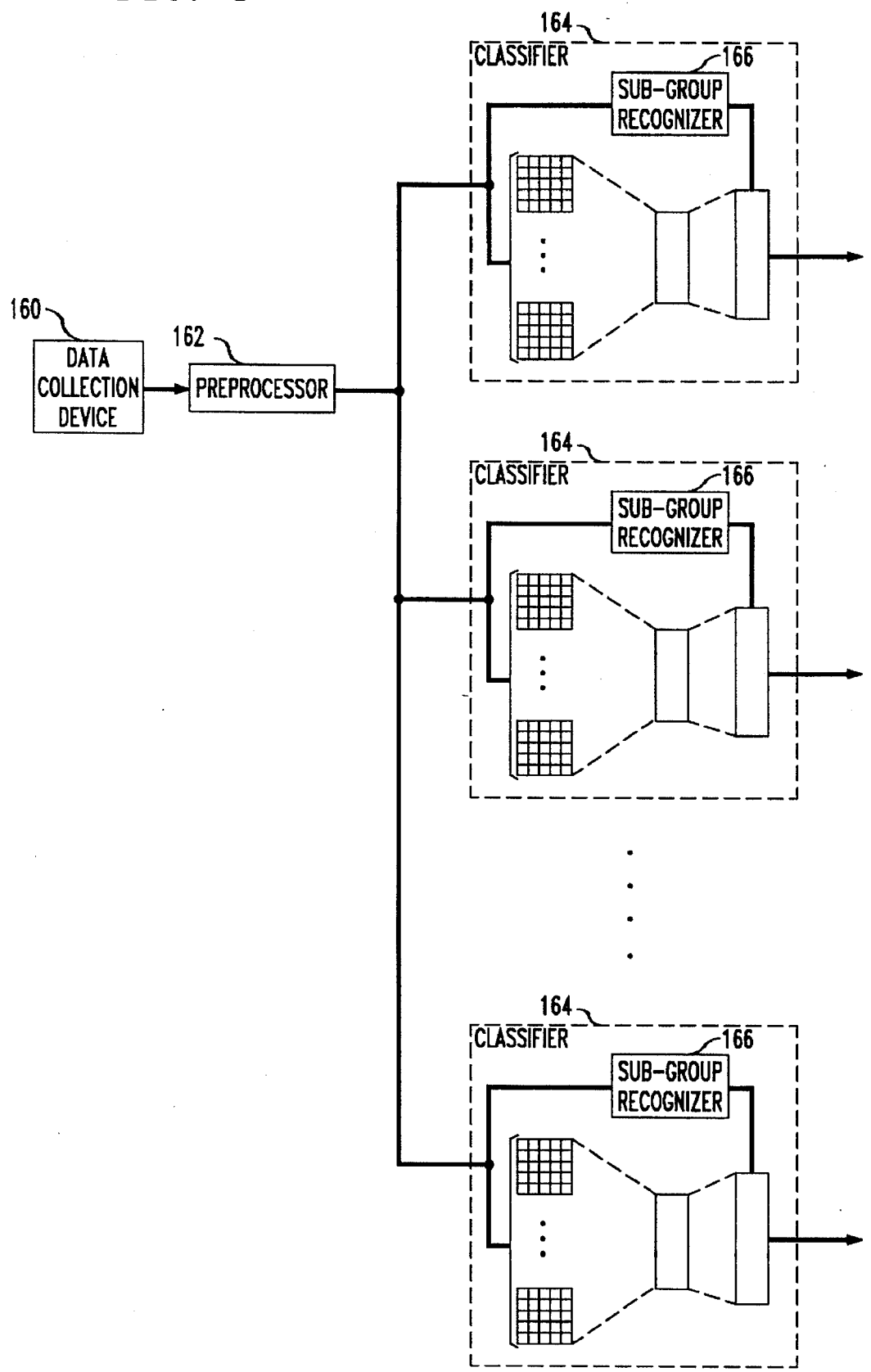
FIG. 8 is a block diagram of a symbol recognition system using a plurality of neural networks.

FIG. 8 is a block diagram of a symbol recognition system that utilizes a plurality of classifiers such as neural networks. Data collection device 160 provides data that describes the symbol to preprocessor 162. The cell values that are provided at the output of preprocessor 162 are provided to the inputs of neural networks 164 in parallel. Data collection device 160 and preprocessor 162 are similar to data collection device 10 and preprocessor 12 of FIG. 1. Each neural network 164 is trained to recognize symbols belonging to a different subgroup of symbols, where the different subgroups compose a larger group of symbols that the recognition system recognizes.

Neural network 164 contains subgroup recognizer 166. Subgroup recognizer 166 determines whether the inputs provided by preprocessor 162 represent a symbol that is within the subgroup that the neural network has been trained to recognize. Since subgroup recognizer 166 only has to determine whether a symbol belongs to a subgroup of symbols, it can be implemented using a simplified classifier or neural network. Subgroup recognizer 166 can also be implemented using a stroke counter that determines the number of strokes that compose a symbol.

Subgroup recognizer 166 controls neural network 164. When subgroup recognizer 166 determines that a symbol is not within a subgroup of symbols that the neural network can recognize, it disables the neural network. When subgroup recognizer 166 determines that a symbol is within the subgroup of symbols that its neural network can recognize, it enables the neural network. It is also possible for subgroup recognizer 166 to control neural network 164 by enabling and disabling some or all of the neural network's inputs and/or outputs. Additionally, subgroup recognizer 166 may force the neural network to a predetermined state or one of a plurality of predetermined states.

This embodiment offers several advantages. Neural networks that are trained for smaller groups of symbols, are less complex, easier to train and have lower error rates. Additionally, the overall error rate is minimized by subgroup recognizer 166 disabling the neural network when a symbol is not within the subgroup that the neural network has been trained to recognize.

It is also possible to implement the preprocessor, subgroup recognizer and/or classifier in software on any convenient computer.

The present invention may also be used to recognize groups of symbols or words. This may be done by breaking a group of symbols into individual symbols and then recognizing each symbol separately, or by recognizing the entire group of symbols simultaneously.

A series of symbols can be broken into individual symbols by preprocessor 12 using the length of a pen-up signal from data collection device 10, the amount of pen displacement to the right, and/or the pen speed to identify the end of one symbol and the beginning of another symbol. Once the symbols are separated, they can be recognized as previously discussed. The recognized symbols can be organized into groups by detecting a relatively long pen-up signal or a relatively large x displacement between symbols of different words. The groups of recognized symbols can be recognized as words using a dictionary similar to dictionaries found in many word processing programs. A device such as a microprocessor or computer can be used as a postprocessor which organizes the symbols into groups and implements a dictionary. It is possible to use the same computer or microprocessor to implement the preprocessor, switching network, classifiers, and/or postprocessor.

Groups of symbols can be recognized simultaneously by separating a series of symbols into word groups. Preprocessor 12 can identify word groups by detecting a relatively long pen-up signal or a relatively large x displacement between symbols of different word groups. The word groups can then be recognized in the same manner as individual symbols are recognized. The word groups should be recognized using an array that has an x dimension which is large enough to encompass the largest word group to be recognized, and using a classifier that has been trained to recognize word groups.

In accordance with the principles of the present invention, it is also possible to recognize groups of symbols simultaneously by using the array as a sliding window over a series of symbols. The window is moved in the x-dimension until the classifier produces a valid output. The technique for using an array as a sliding window is known in the art and is discussed in Ofer Matan, Christopher J. C. Burges, Yann LeCun and John S. Denker, "Multi-Digit Recognition Using a Space Displacement Neural Network", in J. M. Moody, S. J. Hanson and R. P. Lippman (eds) *Neural Information Processing Systems*, Vol. 4, Morgan Kaufmann Publishers, San Mateo, Calif., 1992.

I claim:

1. An apparatus for recognizing symbols, comprising:

means for collecting data that describes a symbol comprising a plurality of micro-segments;

means for associating a micro-segment with at least one cell in a plurality of cells that quantize micro-segment features, where each of said cells has an associated feature label;

means for assigning a cell value to a cell, using a micro-segment value that is related to how well a feature of said micro-segment associated with said cell corresponds to said cell's feature label; and a classifier that receives cell values assigned to said plurality of cells for recognizing said symbol.

2. The apparatus of claim 1 wherein said means for assigning assigns said cell value to said cell using said micro-segment value that is also related to a length of said micro-segment associated with said cell.

3. The apparatus of claim 1 wherein said means for associating associates at least some of said micro-segments with more than one of said cells.

4. The apparatus of claim 1 wherein said means for associating associates said micro-segments with more than one of said cells.

5. The apparatus of claim 1, wherein said classifier comprises a neural network.

6. The apparatus of claim 1, wherein said classifier comprises a convolution neural network.

7. The apparatus of claim 1 wherein said means for assigning assigns said cell value using a sum of micro-segment values from a plurality of micro-segments associated with said cell.

8. The apparatus of claim 1, wherein said means for assigning assigns said cell value based on a micro-segment associated with another cell.

9. A method for recognizing symbols, comprising the steps of:

collecting data that describes a symbol comprising a plurality of micro-segments;

associating a micro-segment with at least one cell in a plurality of cells, that quantize micro-segment features, where each of said cells has an associated feature label;

assigning a cell value to a cell, using a micro-segment value that is related to how well a feature of said micro-segment associated with said cell corresponds to said cell's feature label; and using a classifier that receives cell values assigned to said plurality of cells for recognizing said symbol.

10. An apparatus for recognizing symbols, comprising:

means for collecting data that describes a symbol comprising a plurality of micro-segments;

means for associating a micro-segment with at least one cell in a plurality of cells that quantize micro-segment features, where each of said cells has an associated feature label;

means for assigning a cell value to a cell, using a micro-segment value that is related to a length of said micro-segment associated with said cell; and a classifier that receives cell values assigned to said plurality of cells for recognizing said symbol.

11. The apparatus of claim 10, wherein said classifier comprises a neural network.

12. The apparatus of claim 10, wherein said classifier comprises a convolution neural network.

13. The apparatus of claim 10 wherein said means for assigning assigns said cell value using a sum of micro-segment values from a plurality of micro-segments associated with said cell.

14. A method for recognizing symbols, comprising the steps of:

collecting data that describes a symbol comprising a plurality of micro-segments;

associating a micro-segment with at least one cell in a plurality of cells that quantize micro-segment features, where each of said cells has an associated feature label;

assigning a cell value to a cell, using a micro-segment value that is related to a length of said micro-segment associated with said cell; and using a classifier that receives cell values assigned to said plurality of cells for recognizing said symbol.

15. An apparatus for recognizing symbols, comprising:

means for collecting data that describes a symbol comprising a plurality of micro-segments;

means for associating a micro-segment with at least one cell in a plurality of cells that quantize micro-segment features, where each of said cells has an associated feature label;

means for assigning a cell value to a cell, using a micro-segment value that is related to how well a feature of said micro-segment associated with said cell corresponds to said cell's feature label; and a plurality of classifiers that receive said cell values assigned to said plurality of cells for recognizing said symbol, each classifier having means for controlling said classifier based on whether said symbol belongs to a group of symbols.

16. The apparatus of claim 15, wherein said third plurality of classifiers comprise a neural network.

17. The apparatus of claim 15 wherein said means for assigning assigns said cell value to said cell using said micro-segment value that is also related to a length of said micro-segment associated with said cell.

18. The apparatus of claim 15 wherein said means for assigning assigns said cell value using a sum of micro-segment values from a plurality of micro-segments associated with said cell.

19. The apparatus of claim 15 wherein said means for assigning assigns said cell value based on a micro-segment associated with another cell.

20. A method for recognizing symbols, comprising the steps of collecting data that describes a symbol comprising a plurality of micro-segments;

associating a micro-segment with at least one cell in a plurality of cells that quantize micro-segment features, where each of said cells has an associated feature label;

assigning a cell value to a cell, using a micro-segment value that is related to how well a feature of said micro-segment associated with said cell corresponds to said cell's feature label; and using a plurality of classifiers that receive said cell values assigned to said plurality of cells for recognizing said symbol, each classifier having means for controlling said classifier based on whether said symbol belongs to a group of symbols.

21. An apparatus for recognizing a group of symbols in a series of symbols, comprising:

means for collecting data that describes said group of symbols, said group of symbols having symbols comprising a plurality of micro-segments;

means for associating a micro-segment with at least one cell in a plurality of cells that quantize migro-segment features, where each of said cells has an associated feature label;

means for assigning a cell value to a cell, using a micro-segment value that is related to how well a feature of said micro-segment associated with said cell corresponds to said cell's feature label; and a classifier that receives cell values assigned to said plurality of cells for recognizing said group of symbols.

22. The apparatus of claim 21, further comprising means for separating said series of symbols into said group of symbols.

23. The apparatus of claim 21 wherein said means for assigning assigns said cell value to said cell using said micro-segment value that is also related to a length of said micro-segment associated with said cell.

24. The apparatus of claim 21 wherein said means for assigning assigns said cell value using a sum of micro-segment values from a plurality of micro-segments associated with said cell.

25. The apparatus of claim 21, wherein said means for assigning assigns said cell value based on a micro-segment associated with another cell.

26. A method for recognizing a group of symbols, comprising the steps of:

collecting data that describes said group of symbols, said group of symbols having symbols comprising a plurality of micro-segments;

associating a micro-segment with at least one cell in a plurality of cells that quantize micro-segment features, where each of said cells has an associated feature label;

assigning a cell value to a cell, using a micro-segment value that is related to how well a feature of said micro-segment associated with said cell corresponds to said cell's feature label; and using a classifier that receives said cell values assigned to said plurality of cells for recognizing said group of symbols.

27. A method for recognizing a group of symbols in a series of symbols, comprising the steps of:

collecting data that describes said group of symbols, said group of symbols having symbols comprising a plurality of micro-segments;

separating said series of symbols into individual symbols;

associating a micro-segment with at least one cell in a plurality of cells that quantize micro-segment features, where each of said cells has an associated feature label;

assigning a cell value to a cell, using a micro-segment value that is related to how well a feature of said micro-segment associated with said cell corresponds to said celt's feature label;

generating recognized symbols using a classifier that receive said cell values assigned to said plurality of cells for recognizing said individual symbols; and postprocessing said recognized symbols to recognize said group of symbols.

* * * * *